FIG. I.

INVENTOR.
STEPHEN H. FORD

United States Patent Office 3,216,257
Patented Nov. 9, 1965

3,216,257
HIGH PRESSURE GAS DEW POINT INDICATOR
Stephen H. Ford, Anne Arundel County, Md., assignor to the United States of America as represented by the Secretary of the Navy
Filed May 28, 1963, Ser. No. 284,297
10 Claims. (Cl. 73—335)
(Granted under Title 35, U.S. Code (1952), sec. 266)

The invention described herein may be manufactured and used by or for the Government of the United States of America for governmental purposes without the payment of any royalties thereon or therefor.

This invention relates to dew point measuring devices and more particularly to devices for measuring the dew point of gases at high pressure.

It is well known that the dew point of a gas is an indication of its dryness. In many industries, and in laboratories as well, it is of importance to determine the dryness of gases. Various instruments have heretofore been proposed for this purpose. Particularly with dry gases in high pressure applications each of the prior art instruments have suffered from certain disadvantages. Dew cups have been extensively used to measure dew point. Dew cups, however, are difficult to read for dry gases and have considerable error due to temperature lag. Other instruments are not direct reading at high pressures; they must be used at reduced pressure and the results must be corrected by use of calibration tables. A further disadvantage of many prior devices is that the vapor or dew at the dew point must be detected with the naked eye of the observer and temperature readings must be taken simultaneously, thus introducing the possibility of large human error in the readings which are often rather critical.

An object of this invention is, therefore, the provision of a dew point indicating instrument which lacks the disadvantages of prior art dew point indicating devices.

A further object is to provide an instrument for quickly and simply measuring the dew point of high pressure gases at pressure and without the necessity of correction or conversion tables.

Figure 1:
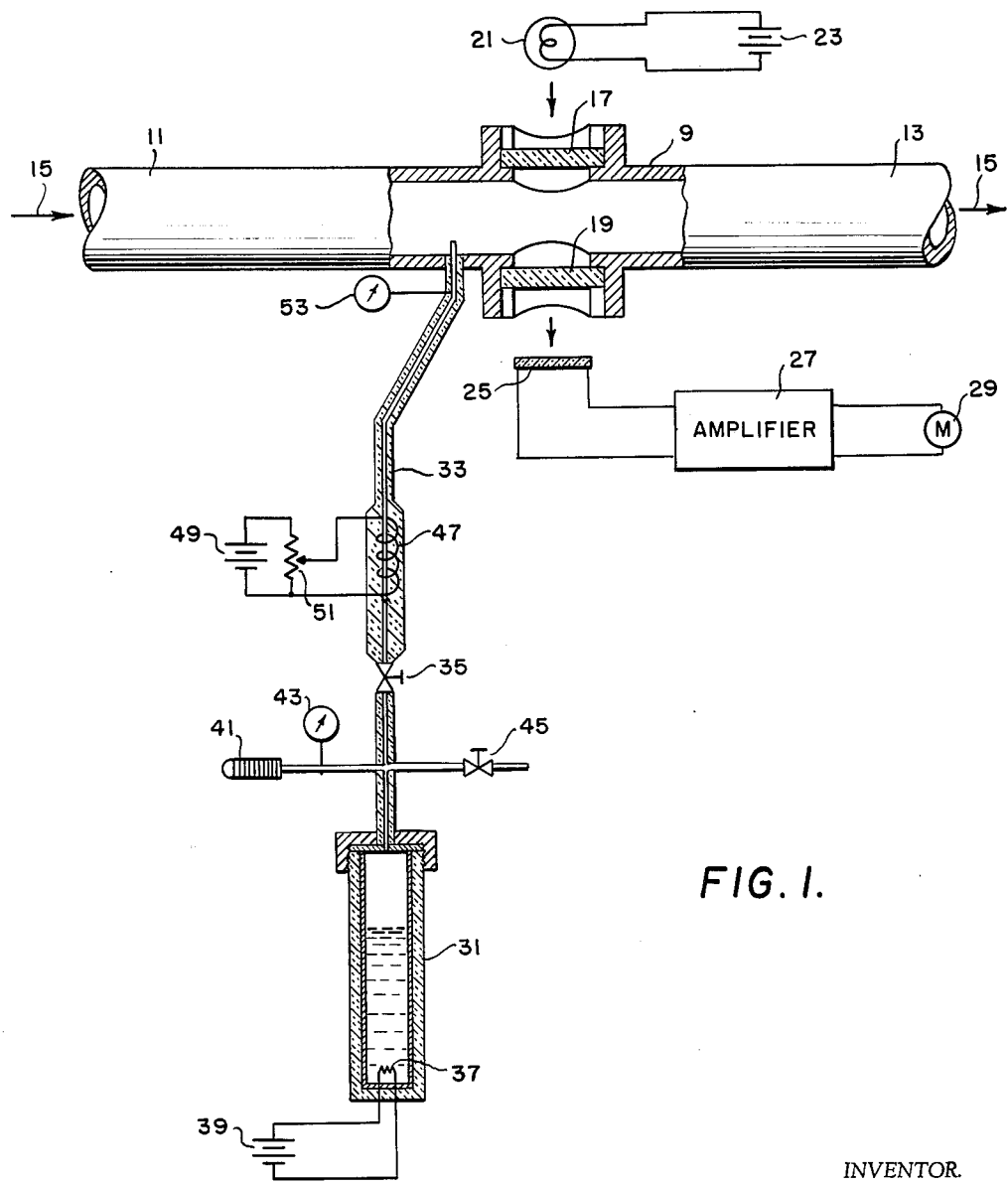
Figure 2:
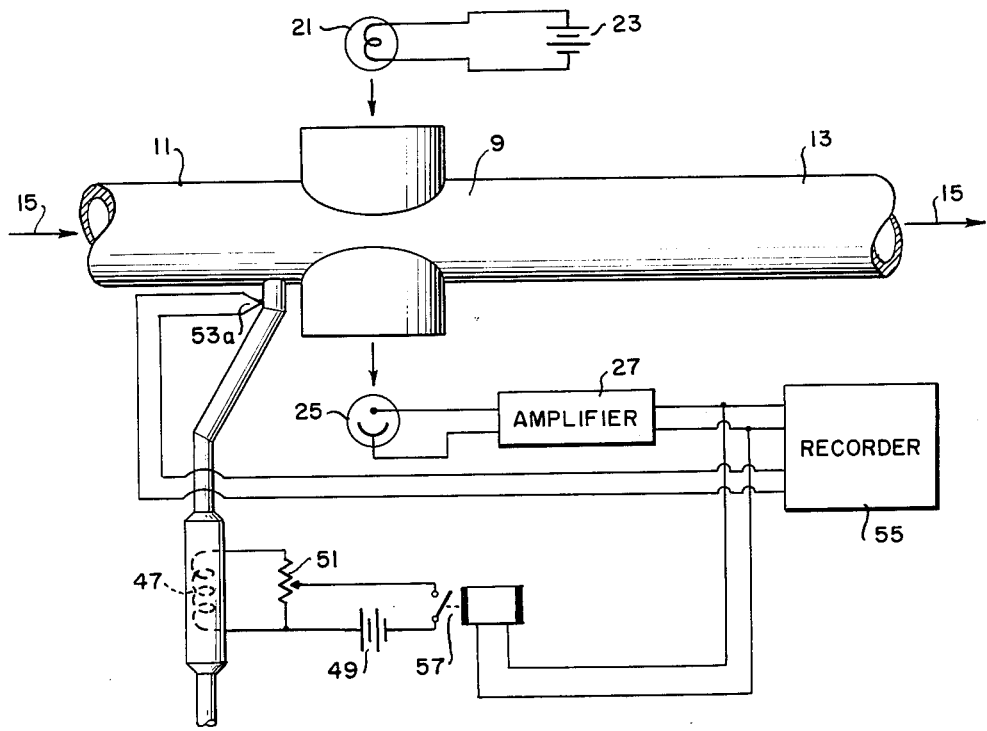

Other objects and many of the attendant advantages of this invention will be readily appreciated as the same becomes better understood by reference to the following detailed description when considered in connection with the accompanying drawings wherein:

FIG. 1 is a schematic view, partly in cross-section, of an embodiment of the invention; and FIG. 2 is a modification of the system of FIG. 1.

Referring now to the drawings, wherein like reference characters designate like or corresponding parts, there is shown in FIG. 1 a tubular member 9 having high pressure gas inlet portion 11 at one end thereof and a high pressure gas outlet portion 13 at the other end thereof. Arrows 15 indicate the direction of flow of the gas to be tested for water content.

A pair of high pressure withstanding quartz lenses 17, 19 are mounted at a center portion of the member 9. A light source 21 which is energized by any suitable means such as a battery 23 is positioned adjacent to one of the quartz lenses. There is positioned adjacent the other lens a photoelectric cell 25 which produces an electrical signal in accordance with the amount of light passing through the lenses 17, 19 and the tubular member 9. The output of the photocell is amplified by a suitable amplifier 27 and transmitted to an indicating meter 29.

A high pressure vessel 31 serving as a container for liquid nitrogen ($N_2$) is connected by means of an insulated tube 33 to a point upstream of the viewing lenses 17, 19 in the tubular member 9 whereby nitrogen gas can be injected into the gas flowing through the tube. A shutoff valve 35 is provided in the tube 33 in order to control the flow of nitrogen from the pressure vessel 31 to the member 9. An electric heater 37, energized by any suitable means such as a battery 39, is provided in the pressure vessel 31 to control evaporation of liquid $N_2$ therein. A safety valve 41, pressure indicator 43, and vent valve 45 may also be provided as a safety precaution. A control heater 47 is energized by any suitable means such as a battery 49 and variable resistance 51 may be provided for controlling the temperature of the $N_2$ injected into the gas being tested. A thermocouple type temperature indicator 53 is provided for measuring the temperature of the $N_2$ near the point where the $N_2$ mixes with the gas in the tubular member 9.

In operation, the instrument is connected in or on a by-pass from the high pressure gas stream to be measured for dew point. Liquid $N_2$ is poured into the pressure vessel 31 and the vessel is capped with the vent valve open. The heater 37 is turned on after the vessel is securely capped and the vent valve 45 and supply valve 35 are closed until the boiling liquid $N_2$ causes the vessel to equalize with the pressure in the line containing gas to be measured. This equalization occurs quite rapidly since residual heat in the vessel walls maintain boiling of the liquid $N_2$. After pressures have equalized, the line valve 35 is opened thus permitting cold $N_2$ gas to flow through the control heating coil 47 and into the gas stream to be measured. The temperature of the $N_2$ gas entering the gas stream is indicated by the thermocouple temperature indicator 53.

When the $N_2$ gas reaches the dew point temperature of the gas being measured, vapor or frost crystals form in the gas stream. The formation of vapor or frost crystals occurs when the temperature of the $N_2$ gas, under control of the variable resistance 51 of heater 47, is decreased to pass thru the dew point of the gas being measured. This crystallized or frosted vapor passes the light beam of the detecting device, reducing the amount of light reaching the photoelectric cell which responds immediately by providing a reduced electrical output. At this point the operator reads from the indicator 53 the temperature of the $N_2$ gas entering the flow stream. This temperature is the dew point temperature of the gas in question. Obviously, the dew point measurement may also be carried out in a reverse manner by increasing the temperature of the $N_2$ gas from below that of the dew point of the gas in tube 9 to temperatures above its dew point. With this mode of measurement, the dew point will be indicated by the passage of a greater amount of light thru the tube 9 to sensing element 25 when crystallization or frosting ceases.

If desired, a recorder can be connected to the device to record both the $N_2$ temperature and the photoelectric cell response. It is also possible to control the electric heater 47 from the photocell output so as to warm the $N_2$ gas until the cloud disappears. The heater then shuts off until a cloud reappears as indicated by the photocell. This alternating gives a series of continuous fixes on dew point temperature. These features may be accomplished for example as shown in FIG. 2 wherein a dual channel recorder 55 is attached to the outputs of the photocell amplifier 27 and the thermocouple 53a. The output of the photocell amplifier 27 is also fed to means dependent on the magnitude of the output current for energizing the control heater 47. Such means is shown in FIG. 2 as a relay 57 wherein when the photocell output drops, indicating vapor in the fluid stream, the relay contacts close the circuit interconnecting the energy source or battery 49, the potentiometer 51 and the heating coils 47. It is to be understood that other suitable means known in the art could also be used for this purpose.

Thus there has been described a high pressure dew point indicator which avoids any necessity of drying the instrument to avoid false readings. The instrument is quickly responsive to changes in moisture content, is easily read without need of conversion tables to obtain dew point at line pressure, is capable of use with high pressure gases, and may be directly connected into the high pressure line for continuous monitoring if desired.

Obviously many modifications and variations are possible in the light of the above teachings. It is, therefore, to be understood that within the scope of the appended claims the invention may be practiced otherwise than as specifically described.

1. A dew point measuring device for use in high pressure gas systems comprising:
   a tubular member having inlet and outlet portions adapted to be connected into a line carrying a stream of gas to be checked for dryness,
   means in said tubular member for allowing observation of the gas passing therethrough,
   means for injecting a temperature varied gas into said stream of gas in said tubular member whereby when the dew point of said gas in said stream is reached vapor or frost become visible through said observation means,
   said means for injecting comprising a pressure vessel containing temperature varied gas in liquid form,
   a valve for controlling flow of temperature varied gas from said pressure vessel, and
   an insulated tube extending from said valve to said tubular member to conduct temperature varied gas thereto.

2. A dew point measuring device according to claim 1 wherein said gas is nitrogen.

3. A dew point indicating device as described in claim 2 wherein said means for injecting a cooled inert gas further comprises variable means for varying the temperature of the nitrogen flowing through said insulated tube.

4. A dew point indicating device as described in claim 3, wherein said means for allowing observation of the gas in said tubular member comprise:
   a pair of diametrically opposed windows in said tubular member, and
   means for directing light inwardly through one of said windows, through the gas stream and out of the other of said pair of windows.

5. A dew point indicating device as described in claim 4 and further including:
   a photocell positioned to receive light passing out of said windows, and
   means for indicating changes in the output of said photocell.

6. A dew point indicating device as described in claim 5 wherein said means for indicating changes in the output of said photocell include a recording device for recording an electrical signal representative of said photocell output.

7. A dew point indicating device as described in claim 5 but further including means responsive to the output of said photocell for controlling said means for heating the nitrogen flowing through said insulated tube.

8. A dew point indicating device as described in claim 7 but further including:
   temperature responsive means for producing a signal responsive to the temperature of said nitrogen in said insulated tube, and
   means for recording the signal produced by said temperature responsive means.

9. A dew point indicator as set forth in claim 8 but further including heating means in said pressure vessel for controlling the pressure therein.

10. A dew point indicator as set forth in claim 9 and further including a safety valve on said pressure vessel to relieve the pressure therein in case of overpressures.

References Cited by the Examiner
UNITED STATES PATENTS

| 1,883,116 | 10/32 | Tomlinson | 73—336.5 |
| 2,415,776 | 2/47  | Walton    | 73—17    |
| 2,466,696 | 4/49  | Friswold et al. | 73—17 X |
| 2,893,237 | 7/59  | Coriolis et al. | 73—17 |
| 2,938,423 | 5/60  | Rich      | 73—17 X  |
| 3,011,387 | 12/61 | Johnson   | 88—14    |

FOREIGN PATENTS 551,989   3/93   Great Britain.

ISAAC LISANN, *Primary Examiner.*